(12) United States Patent
Kim

(10) Patent No.: US 7,931,141 B2
(45) Date of Patent: Apr. 26, 2011

(54) GOLF BAG CARRIER

(75) Inventor: Jung-Han Kim, Seoul (KR)

(73) Assignee: King Tiger Corp. (KR)

( * ) Notice: Subject to any disclaimer, the term of this patent is extended or adjusted under 35 U.S.C. 154(b) by 780 days.

(21) Appl. No.: 11/864,498

(22) Filed: Sep. 28, 2007

(65) Prior Publication Data

US 2008/0078683 A1 Apr. 3, 2008

(30) Foreign Application Priority Data

Sep. 28, 2006 (KR) .................. 20-2006-0026410 U
Jun. 20, 2007 (KR) ........................ 10-2007-0060239

(51) Int. Cl.
*A63B 55/08* (2006.01)

(52) U.S. Cl. ............... 206/315.7; 280/DIG. 6; 280/646; 280/652

(58) Field of Classification Search .................. 280/646, 280/652, DIG. 6; 206/315.7, 315.3
See application file for complete search history.

(56) References Cited

U.S. PATENT DOCUMENTS

| | | | | | |
|---|---|---|---|---|---|
| 2,740,638 | A | * | 4/1956 | Chamberlin et al. | 280/42 |
| 3,471,162 | A | * | 10/1969 | Meiklejohn | 280/47.26 |
| 5,074,577 | A | * | 12/1991 | Kim | 280/646 |
| 5,480,178 | A | * | 1/1996 | Suk | 280/646 |
| 6,139,047 | A | * | 10/2000 | Kim | 280/646 |
| 6,182,983 | B1 | * | 2/2001 | Kim | 280/47.26 |
| 6,874,798 | B2 | * | 4/2005 | Kang | 280/47.18 |

* cited by examiner

*Primary Examiner* — Tri M Mai
(74) *Attorney, Agent, or Firm* — The Farrell Law Firm, PC.

(57) ABSTRACT

A golf bag carrier includes a pivot adjusting unit, at least one strut pivotally coupled to the pivot adjusting unit and adjusted in an angle with respect to a ground by the pivot adjusting unit, at least one wheel coupled to a lower end of the strut to move the golf bag, a fixing plate to which the pivot adjusting unit having the strut and the wheel are fixed, a vertical bar that is fixedly installed on a central portion of the fixing plate, and a fixing unit that is installed on the golf bag to detachably fix the vertical bar on the golf bag.

5 Claims, 13 Drawing Sheets

GOLF BAG CARRIER

CROSS-REFERENCE TO RELATED APPLICATION

This application claims priorities to and the benefit of Korean Patent Application No. 10-2007-0060239 filed in the Korean Intellectual Property Office on Jun. 20, 2007, Korean Utility Application No. 20-2006-0026410 filed in the Korean Intellectual Property Office on Sep. 28, 2006, the entire contents of which are incorporated herein by reference.

BACKGROUND OF THE INVENTION

1. Field of the Invention

The present invention relates to a golf bag carrier, and more particularly, to a golf bag carrier that can be used to conveniently carry a golf bag, can be detachably mounted on the golf bag, and has a golf bag support that can be easily replaced.

2. Description of the Related Art

Generally, a golf bag is designed to be carried on golfer's shoulder or back. This makes walking round on big golf courses more difficult.

Therefore, most of the golfers play golf with a golf bag carrier such as a golf bag cart or with a caddy. The golf bag carrier such as the golf bag cart is heavy and bulky. Therefore, it is still difficult to carry the golf bag even when the golfer uses the golf bag carrier. When the golfer is accompanied by the caddy, it costs a lot. To solve these problems, a golf bag on which a golf bag carrier is integrally mounted has been developed.

Korean patent registration number 0295962, which is issued to the applicant of this application, discloses a golf bag carrier mounted on a golf bag.

Figure 12:
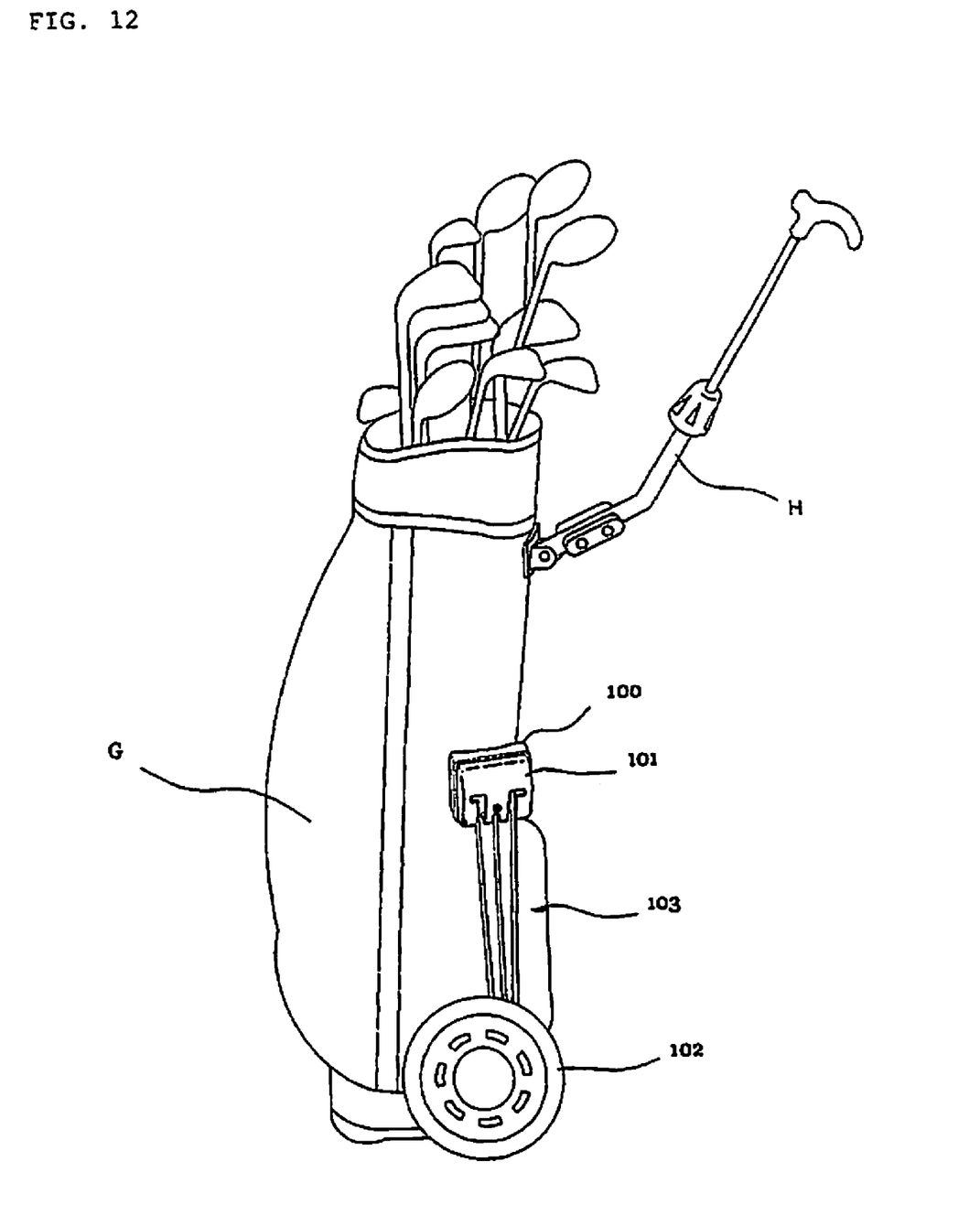
FIG. 12 is a perspective view of a conventional golf bag carrier.

As shown in FIG. 12, the golf bag carrier disclosed in the patent includes a support plate 100 fixed on a golf bag G, a main plate 101 that is detachably installed on the support plate 100, a strut unit 103 that is pivotally coupled to the main plate 101 and to which a wheel 102 is mounted, and a handle unit H coupled to an upper portion of the golf bag G.

The above-described golf bag carrier is used by fixing the main plate 101 on the golf bag G. Therefore, in order to carry the golf bag or make the golf bag stand on a ground, an angle of the strut unit 103 is properly adjusted to easily carry the golf bag or stably make the golf bag stand.

However, in the above-described golf bag carrier, since the support plate is directly fixed on the golf bag, a load applied to the golf bag by golf clubs stored in the golf bag is excessive and thus a portion of the golf bag, to which the support plate is coupled, may become torn.

Further, the number of assembling processes of the support plate on the main body of the golf bag increases. This may cause the inferiority of the golf bag.

SUMMARY OF THE INVENTION

Embodiments of the present invention provide a golf bag carrier that can be used to conveniently carry a golf bag and prevent the golf bag from being damaged by securely supporting a load applied to the golf bag.

Embodiments of the present invention also provide a golf bag carrier that can be inexpensively manufactured, assembled through a simple process, and easily attached on and detached from the golf bag.

Embodiments of the present invention also provide a golf bag carrier that can be separated from a golf bag when a user intends to use a special golf cart.

In an embodiment, a golf bag carrier includes a pivot adjusting unit; at least one strut pivotally coupled to the pivot adjusting unit and adjusted in an angle with respect to a ground by the pivot adjusting unit; at least one wheel coupled to a lower end of the strut to move the golf bag; a fixing plate to which the pivot adjusting unit having the strut and the wheel are fixed; a vertical bar that is fixedly installed on a central portion of the fixing plate; and a fixing unit that is installed on the golf bag to detachably fix the vertical bar on the golf bag.

The fixing unit may include a lower end fixing member supporting a lower end of the vertical bar and an upper end fixing member supporting an upper end of the vertical bar, the lower end fixing member being provided with a coupling groove in which a lower end portion of the vertical bar is inserted down to a predetermined depth and fixedly installed on a lower portion of the golf bag G, and the upper end fixing member detachably supporting the upper end of the vertical bar.

The upper end fixing member may include a plate on which a pair of guide rails are formed; a guide block having guide grooves that are movably coupled to the guide rails formed on the plate and a space portion in which the upper end portion of the vertical bar is inserted; an elastic unit biasing the guide block downward; and a positioning unit that sets a location where the vertical bar is located within the space portion by moving the guide block downward and a location where the vertical bar ascends to separate the vertical bar.

The elastic unit may include a fixing projection that vertically protrudes on an inner top surface of the guide block, a spring having a first end fitted around the fixing projection and a second end hooked on the plate, and a shielding plate that is formed on the plate to prevent the guide block from being removed upward by biasing force of the spring.

The positioning unit may include an adaptor that extends from the guide block and is provided with a hook rod receiving groove extending toward the plate and an operational button receiving groove formed through a side surface; a hook rod that is movably inserted in the hook rod receiving groove, provided with an inclined slit formed on a side surface thereof, and biased by a spring; an operational button that is movably inserted in the operation button receiving groove, engaged with the slit, provided with an operational rib to ascend and descend the hook rod, and biased by a spring; and a hook groove that is formed on the plate to hook the hook rod protruding and to determine a stopping position of the guide block in a vertical direction.

The pivot adjusting unit may include a main body coupled to the fixing plate; and an outer cover that is coupled to the main body and provided with a guide groove supporting a pivot motion of a second strut, a guide slot supporting a pivot motion of a first strut, and a second guide groove maintaining a pivot state of the first strut.

The pivot adjusting unit may include a guide rail formed on a main body of the pivot adjusting unit; a guide groove which is formed on the fixing plate and in which the guide rail is inserted and fitted; and a fixing unit for fixing and separating the main body fitted in the guide groove.

Alternatively, the fixing unit may include a hook rod provided with a fitting groove in which the guide rail of the main body inserted in the guide grooves is fitted; and a spring that biases the hook rod in a through hole formed in the fixing plate so that the hook rod can ascend and descend.

The golf bag carrier may further includes two struts that are fixed by a hinge unit on an upper end of the vertical bar that are fixed by the upper and lower end fixing members to support the golf bag in an unfolded state and closely contact the golf bag in an folded state; and an actuating unit that unfolds the struts to support the golf bag when the golf bag G is inclined at a first predetermined angle or more and to folds the struts when the golf bag is inclined at a second predetermined angle less than the first predetermined angle.

The hinge unit may include a hinge member provided at both sides with hinge shafts; and fitting members that are rotatably fitted around the hinge shafts and further coupled to both sides of the upper end of the struts.

The hinge shafts may be formed to be inclined rearward at a predetermined angle with respect to the hinge member so that the struts can be widely unfolded to stably support the golf bag.

The actuating unit may include fitting portions protruding from the respective fitting members; springs having respective first ends that are respectively fitted around the fitting portions to be capable of rotating and respective second ends that bias the fitting portions inward by being fixed by a spring coupling member; an actuating arm having an upper end fitted in a lower end of the spring coupling member and extending downward over the lower end of the vertical bar; and a guide member fixedly installed on the lower end portion of the vertical bar and provided with a guide hole in which the actuating arm is movably inserted.

The golf bag carrier may further include a ground contact member that is coupled to a lower end of the actuating arm so that the support assembly can be supported on a larger area of the ground.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
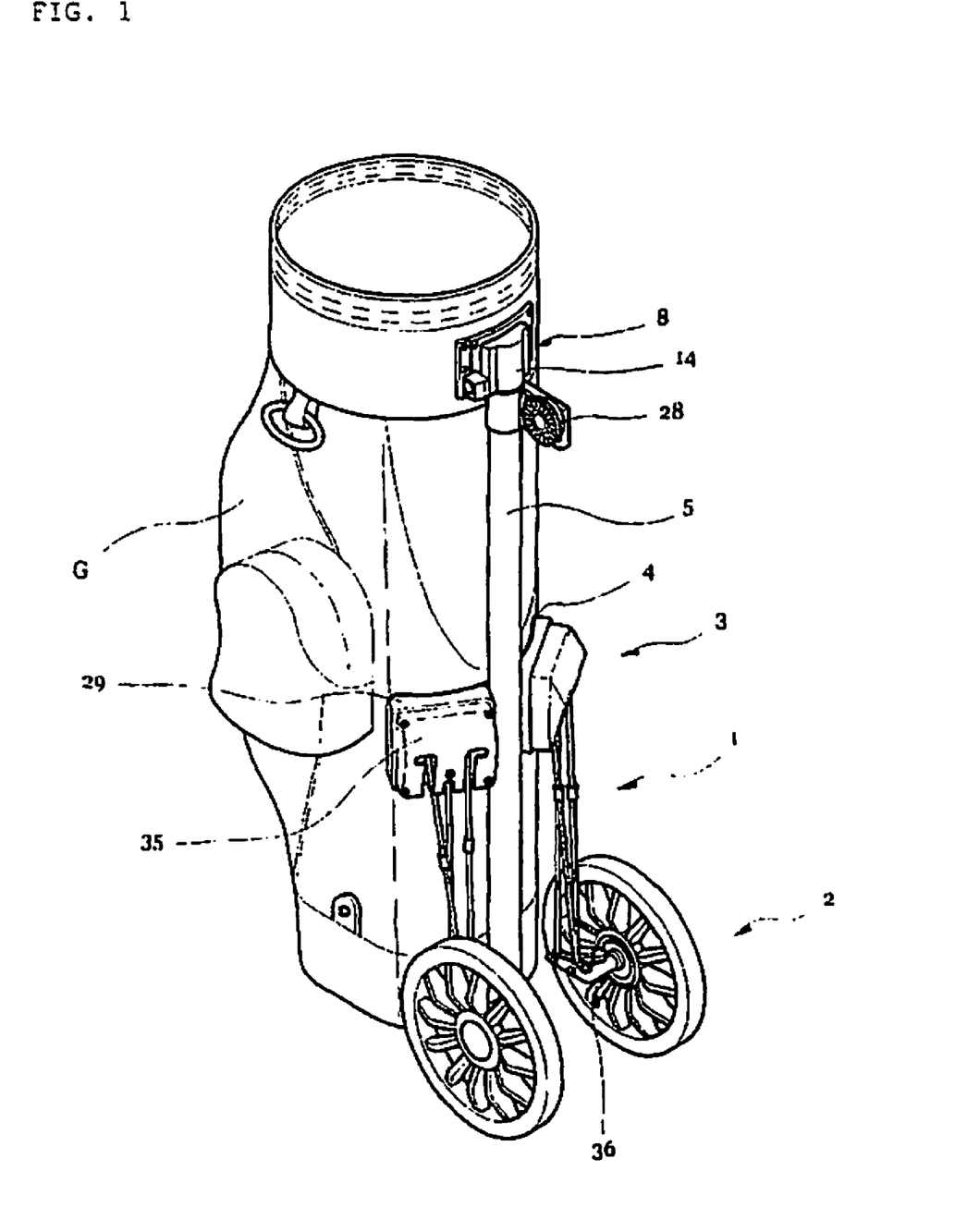
FIG. 1 is a perspective view of a golf bag carrier attached on a golf bag according to an embodiment of the present invention.
Figure 2:
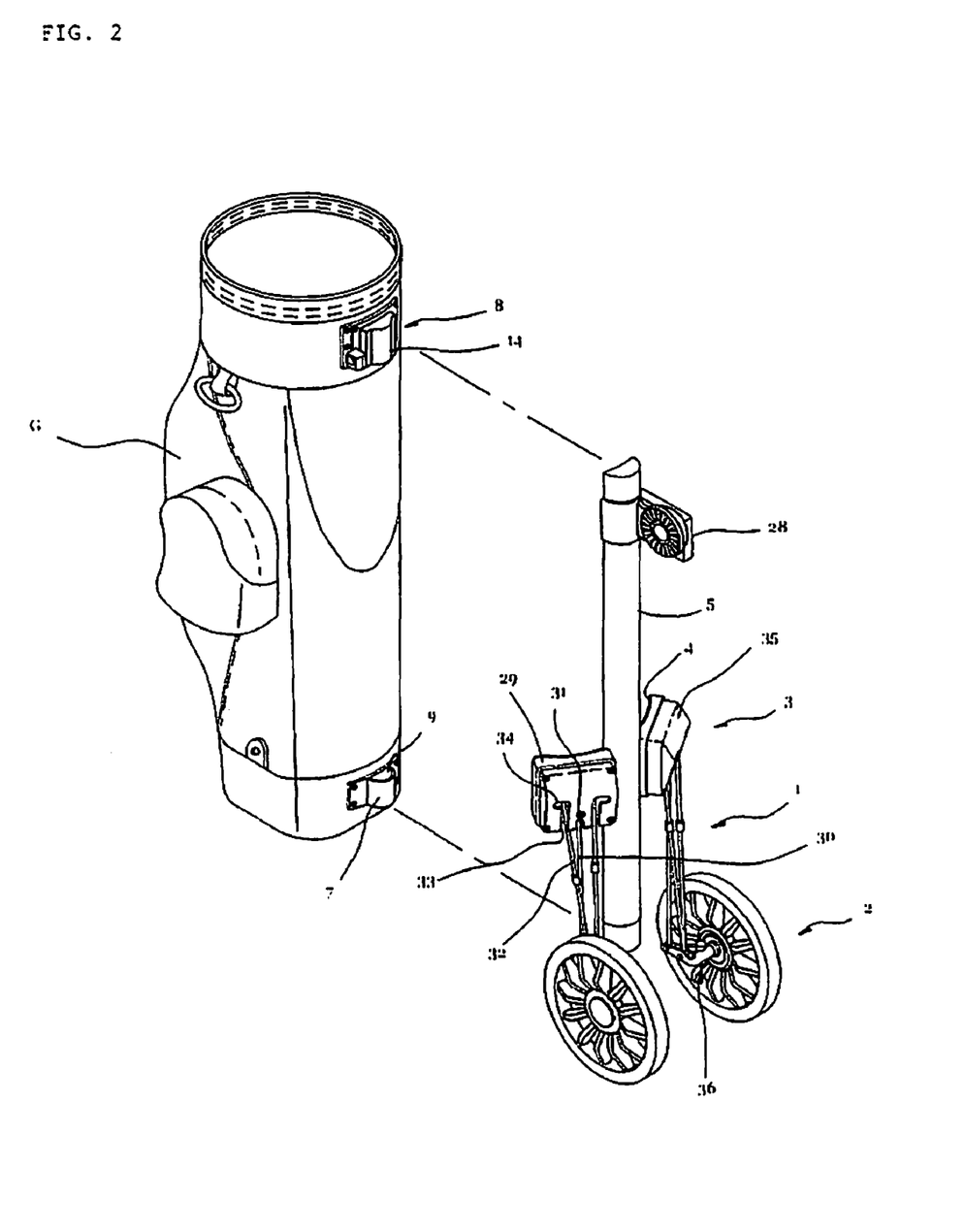
FIG. 2 is a perspective view of the golf bag carrier of FIG. 1, which is separated from the golf bag.

FIG. 1 is a perspective view of a golf bag carrier attached on a golf bag according to an embodiment of the present invention, and FIG. 2 is a perspective view of the golf bag carrier of FIG. 1, which is separated from golf bag.

A golf bag carrier includes a fixing plate 4 to which a pivot adjusting unit 3 having strut units 1 and wheels 2 are fixed, a vertical bar 5 that is fixedly installed on a central portion of the fixing plate 4, and a fixing unit that is installed on the golf bag G to detachably fix the vertical bar 5 on the golf bag G.

That is, the pivot adjusting unit 3 having the strut units 1 and the wheels 2 are mounted on the fixing plate 4 and the vertical bar 5 is detachably mounted on the golf bag G by the fixing unit. Therefore, it becomes easy to detach and attach the pivot adjusting unit 3 from and on the golf bag G. In addition, when the golf bag carrier is installed on the golf bag G, a load applied to the golf bag G is transmitted to the fixing plate 4 through the vertical bar 5. This prevents the golf bag G from becoming torn.

Here, the fixing plate 4 tightly contacts the golf bag G. It simply functions to support the pivot adjusting unit 3 in a state where no load is applied. The fixing plate 4 is curved in response to a curvature of an outer circumference of the golf bag G so that the fixing plate 4 can closely contact the golf bag G.

The fixing plate 4, the vertical bar 5, and the pivot adjusting unit are coupled by fasteners such as screws 6 or rivets. The fixing plate 4 is formed of a material having excellent strength and durability, such as metal plate or reinforced plastic.

The fixing unit includes a lower end fixing member 7 supporting a lower end of the vertical bar 5 and an upper end fixing member 8 supporting an upper end of the vertical bar 5. At this point, the upper end fixing member 8 detachably supports the upper end of the vertical bar 5.

The lower end fixing member 7 is provided with a coupling groove 9 in which a lower end portion of the vertical bar 5 is inserted down to a predetermined depth. The lower end fixing member 7 is fixedly installed on a lower portion of the golf bag G.

Figure 4:
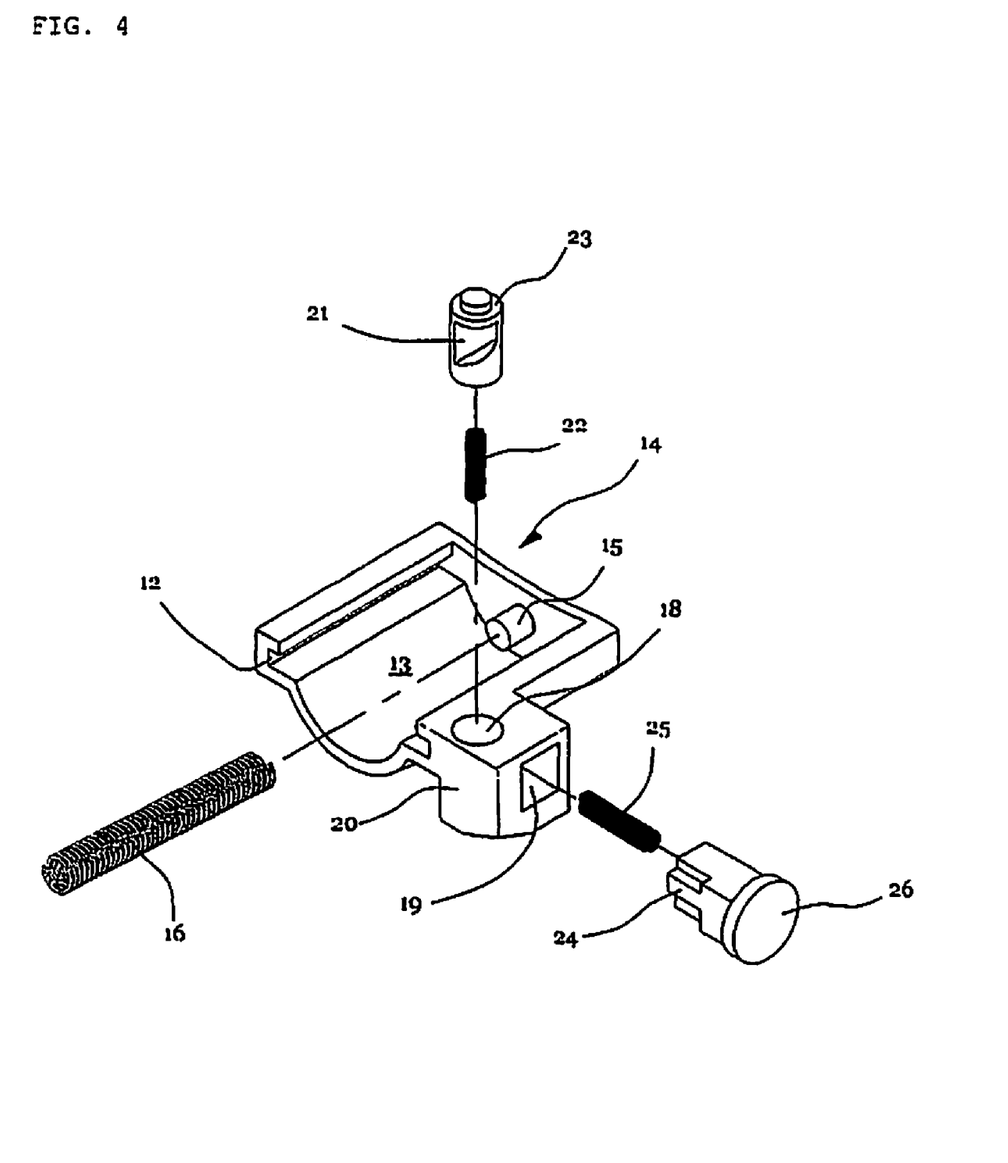
FIG. 4 is an exploded perspective view of an upper end fixing unit of the golf bag carrier of FIG. 2.
Figure 5:
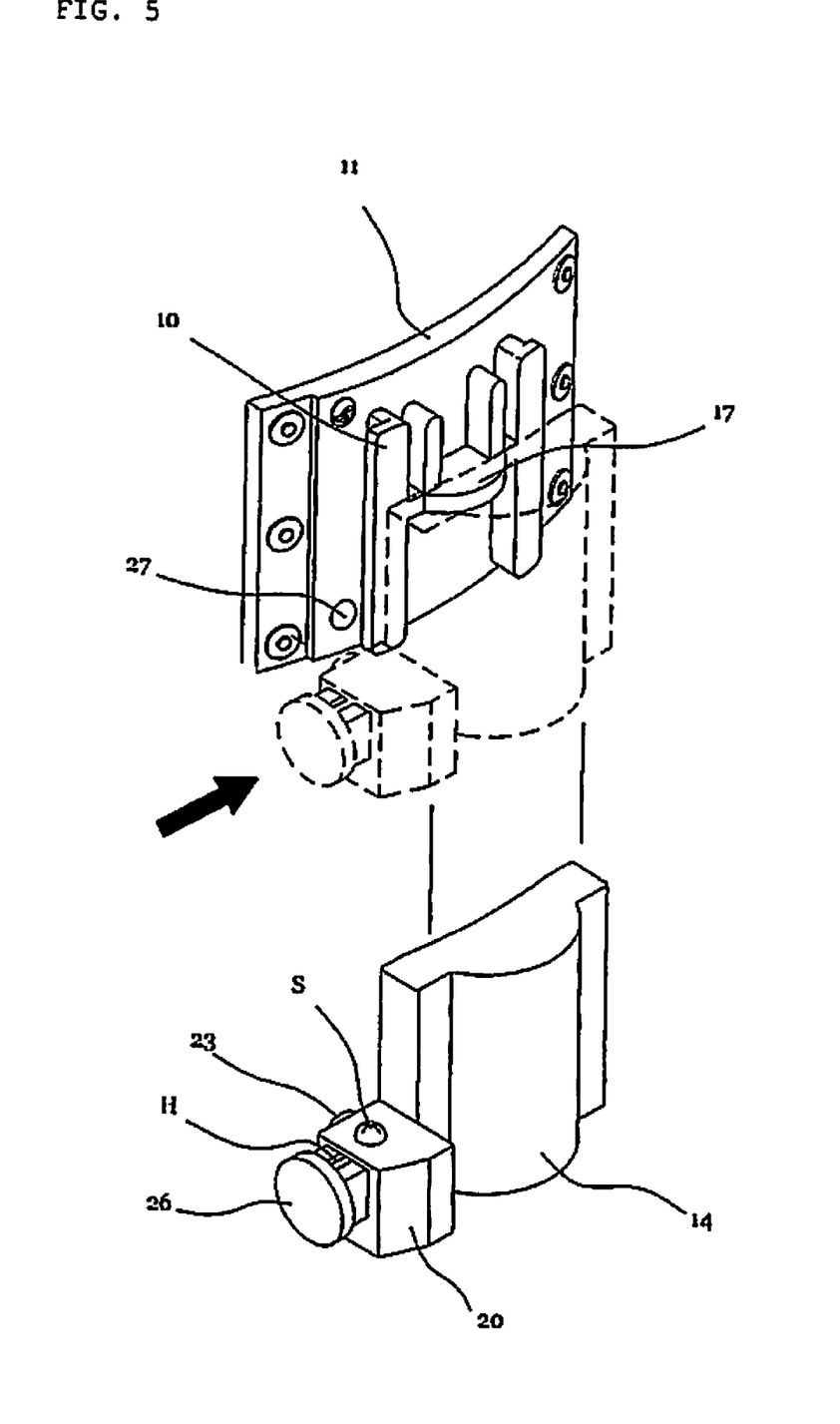
FIG. 5 is a perspective view illustrating an operation state of a guide block of the golf bag carrier of FIG. 2.

As shown in FIGS. 2, 4, and 5, the upper end fixing member 8 is fixedly installed on an upper portion of the golf bag G by fasteners such as rivets. The upper end fixing member 8 includes a plate 11 on which a pair of guide rails 10 are formed, a guide block 14 having guide grooves 12 that are movably coupled to the guide rails 10 formed on the plate 11 and a space portion 13 in which the upper end portion of the vertical bar 5 is inserted, an elastic unit biasing the guide block 14 downward, and a positioning unit that locates the vertical bar 5 within the space portion 13 by moving the guide block 14 downward and ascends the vertical bar 5 to separate the vertical bar 5.

That is, when the guide block 14 moves downward in a state where the vertical bar 5 closely contacts the plate 11, the vertical bar 5 fixedly mounted on the golf bag G. When the guide block 14 moves upward, the vertical bar 5 is separated.

The elastic unit includes a fixing projection 15 that vertically protrudes on an inner top surface of the guide block 14, a spring 16 having a first end fitted around the fixing projection 15 and a second end hooked on the plate 11, and a shielding plate 17 that is formed on the plate 11 to prevent the guide block 14 from being removed upward by biasing force of the spring 16.

Further, the positioning unit includes an adaptor 20 that extends from the guide block 14 and is provided with a hook rod receiving groove 18 extending toward the plate 11 and an operational button receiving groove 19 formed through a side surface, a hook rod 23 that is movably inserted in the hook rod receiving groove 18, provided with an inclined slit 21 formed on a side surface thereof, and biased by spring 22, an operational button 26 that is movably inserted in the operation button receiving groove 19, engaged with the slit 21, provided with an operational rib 24 to ascend and descend the hook rod 23, and biased by a spring 25, a hook groove 27 that is formed on the plate 11 to fix the hook rod 23 protruding and to determine a stopping position of the guide block 14 in a vertical direction.

That is, when the operational button 26 is pushed, the hook rod 23 is received in the receiving groove 18. When the operational button 26 is not pushed, the hook rod 23 protrudes out of the receiving groove 18. When the hook rod 23 is hooked in the hook groove 27, the stationary position of the guide block 14 in the vertical direction is determined.

Here, a coupling unit 28 for fixing a handle H of FIG. 12 is installed on an upper end portion of the vertical bar 5. A stopper groove H is formed on the operational button 26 so that the operational button 26 can move without being separated. A screw S is coupled to the adaptor 20 so that the screw S can be hooked on the stopper groove H.

Figure 3:
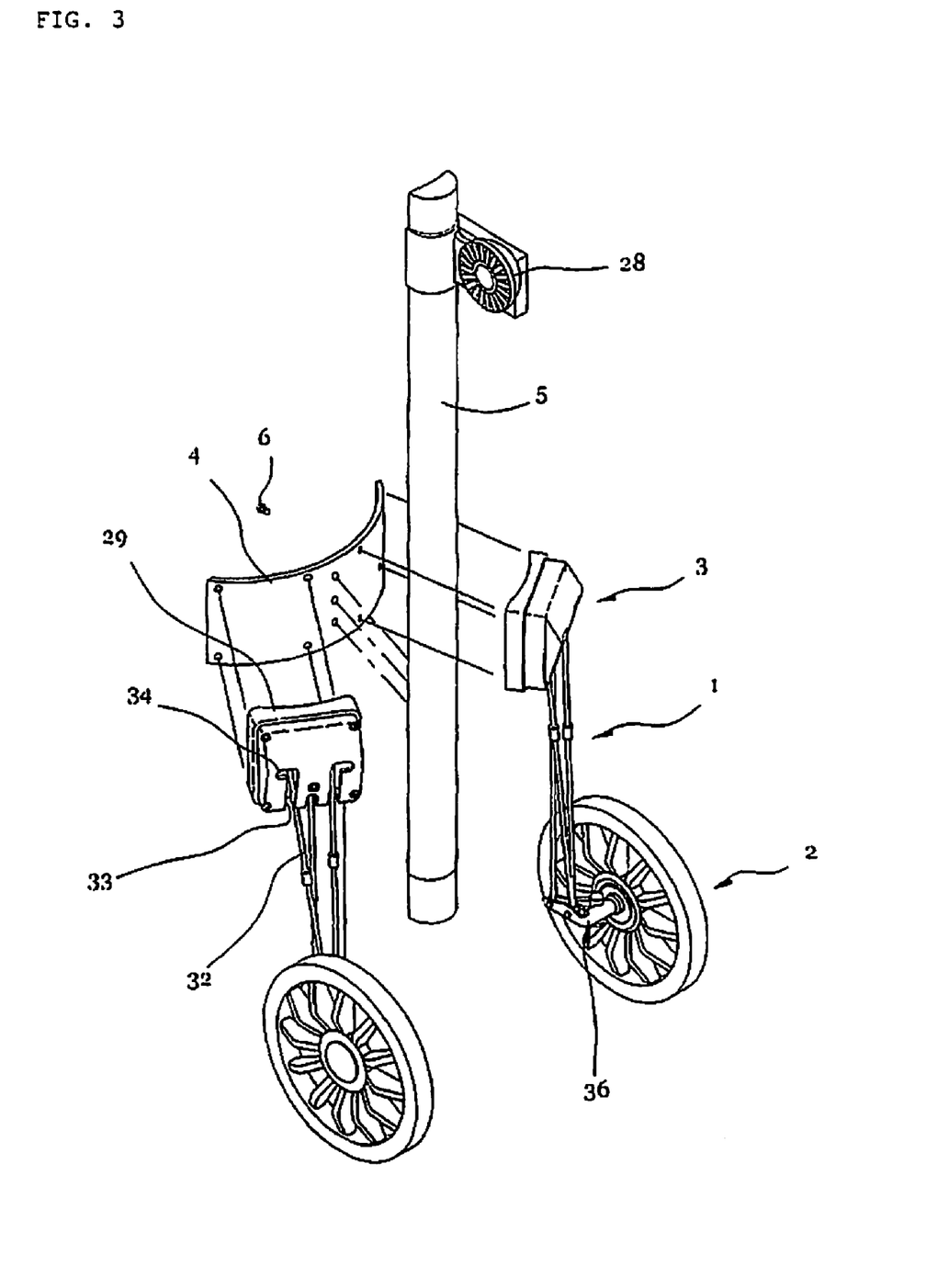
FIG. 3 is a perspective view of a vertical bar and pivot adjusting unit of the golf bag carrier of FIG. 2.

As shown in FIGS. 2 and 3, the pivot adjusting unit 3 includes a main body 29 coupled to the fixing plate 4 and an outer cover 35 that is coupled to the main body 29 and provided with a guide groove 31 supporting a pivot motion of a second strut 30, a guide slot 33 supporting a pivot motion of a first strut 32, and a second guide groove 34 maintaining a pivot state of the first strut 32.

The wheel 2 is connected to the strut unit 1 having the first and second struts 32 and 30 by a trailing assembly 36. When the first and second struts 32 and 30 are unfolded, it becomes possible that the golf bag G to stand in a slightly inclined state. When the first and second struts 32 and 30 are folded, the carrier closely contacts the outer circumference of the golf bag G.

Therefore, when the user plays the walking round on the golf courses, the user carries the golf bag with the strut unit 1 folded. When the user does not carry the golf bag to hit a ball, the user can allows the golf bag to stably stand by unfolding the strut unit 1.

The following will describe an operation effect of this embodiment.

In order to install the golf bag carrier on the golf bag G, the lower end of the vertical bar 5 is first fixedly inserted in the coupling groove 9 of the lower end fixing member 7 and the upper end portion of the vertical bar 5 is placed on the plate 11.

Next, when the guide block 14 slides down so that the hook rod 23 is fixedly fitted in a hook groove 27 formed on the plate 11, the upper end of the vertical bar 5 is received in the space portion 13 formed on an under surface of the guide block 14, thereby completing the installation of the golf bag carrier on the golf bag.

Further, in order to separate the golf bag carrier from the golf bag G, the guide block 14 moves downward by pushing the operational button 26. That is, when the operational button 26 is pushed, an operational rib 24 formed on the operational button 26 moves frontward. Then, the hook rod 23 moves upward by the slit 21 engaged with the operation rib 24 and thus the hook rod 23 is released from the hook groove 27, thereby ascending the guide block 14.

That is, by using the vertical bar 5 and the upper end fixing member 8, the golf bag carrier can be easily attached on or detached from the golf bag G and the golf bag carrier can be securely support the load of the golf bag G.

Figure 6:
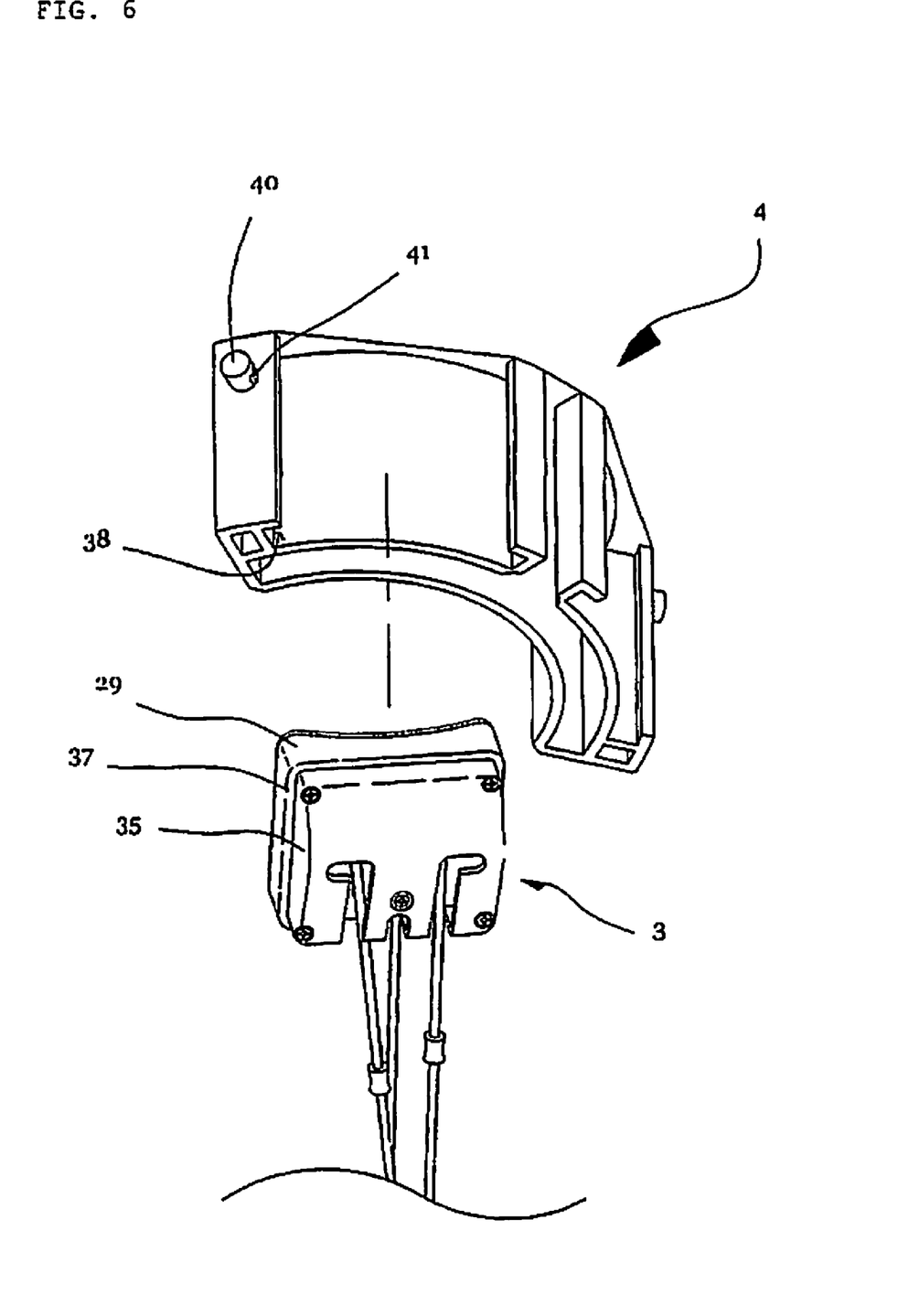
FIG. 6 is a mounting/dismounting unit that can mount or dismount a main body of a pivot adjusting unit from a fixing plate according to another embodiment of the present invention.
Figure 7:
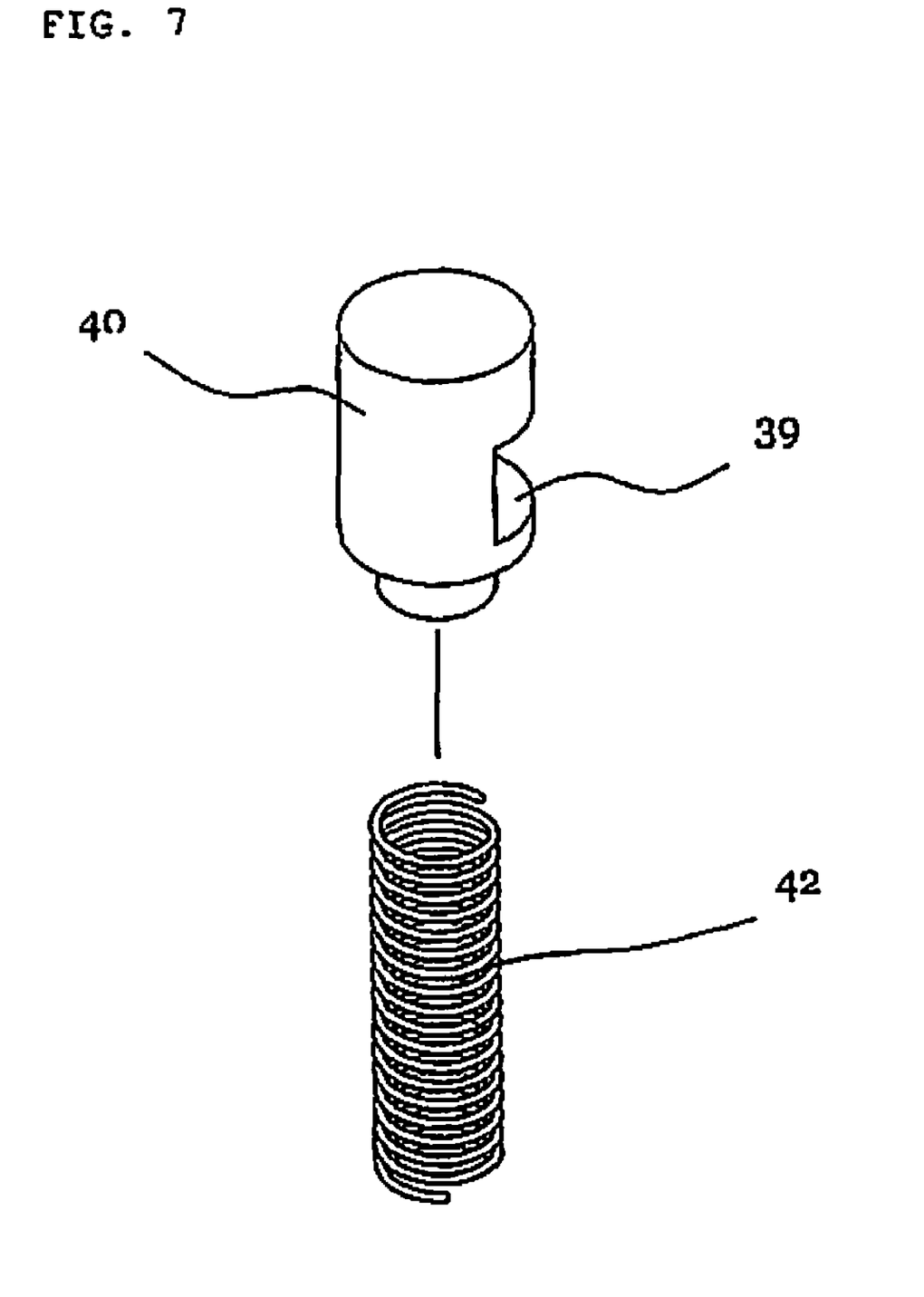
FIG. 7 is a perspective view of a hook rod and a spring of FIG. 6.

FIGS. 6 and 7 show a pivot adjusting unit and a fixing unit according to another embodiment of the present invention. In this embodiment, the pivot adjusting unit 3 and the fixing plate 4 are designed to be easily assembled with each other by a simple structure. That is, this assembling structure includes a guide rail 37 formed on a main body 29 of the pivot adjusting unit 3, guide grooves 38 which are formed on the fixing plate 4 and in which the guide rail 37 is inserted and fitted, and a fixing unit for fixing and separating the main body 29 fitted in the guide groove 38.

The fixing unit includes a hook rod 40 provided with a fitting groove 39 in which the guide rail 37 of the main body inserted in the guide grooves 38 is fitted and a spring 42 that biases the hook rod 40 in a through hole 41 formed in the fixing plate 4 so that the hook rod 40 can ascend and descend.

That is, when the pivot adjusting unit 3 is inserted in the guide grooves 38 in a state where the hook rod 40 is pushed, the guide rail 38 is fitted in the fitting groove 39 of the hook rod 40. When the pushing of the hook rod 40 is released, the hook rod 40 moves upward and the guide rail 38 is fixed by the fitting groove 39, thereby fixing the pivot adjusting unit 3.

Needless to say, since the main body 29 is easily taken out in a state where the hook rod 40 is pushed, the pivot adjusting unit 3 can be easily separated.

FIGS. 8a, 8b, 9, and 10 show a support assembly that can be used when the pivot adjusting unit is not used but a special golf bag cart is used.

Figure 8A:
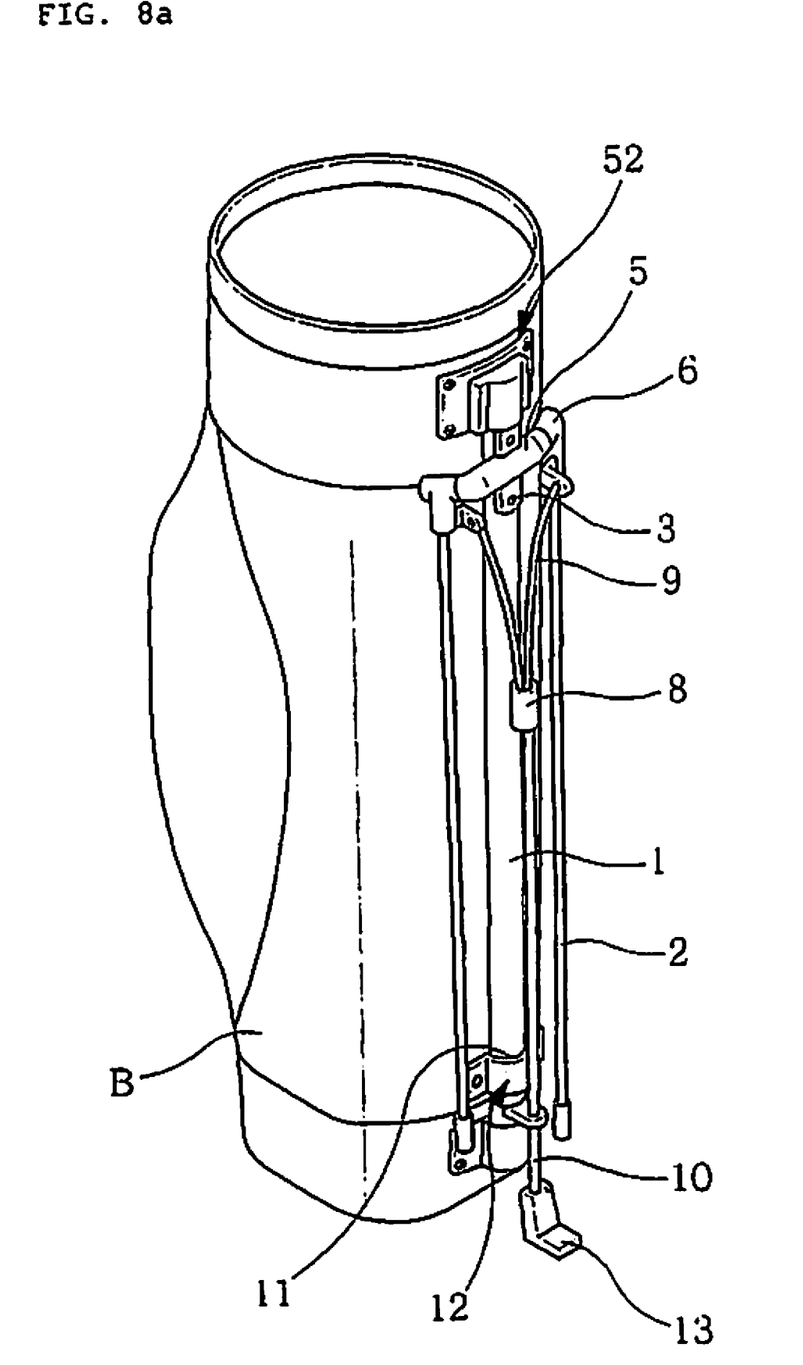
FIG. 8a is a perspective view of a golf bag carrier according to another embodiment of the present invention, illustrating a state where a support unit is replaced according to another embodiment of the present invention.
Figure 8B:
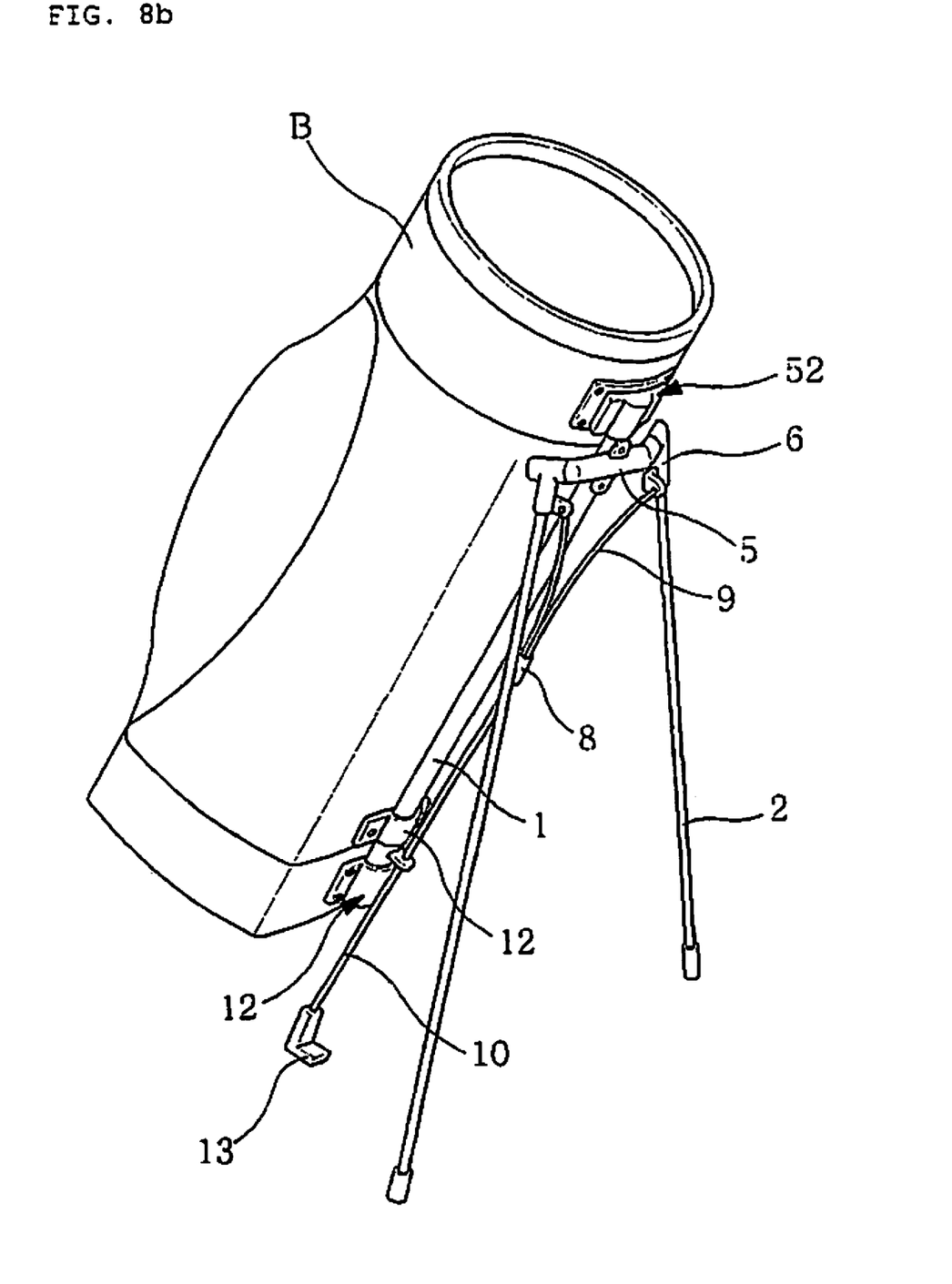
FIG. 8b is a perspective view of the golf bag carrier of FIG. 8a, when the support unit is unfolded.
Figure 9:
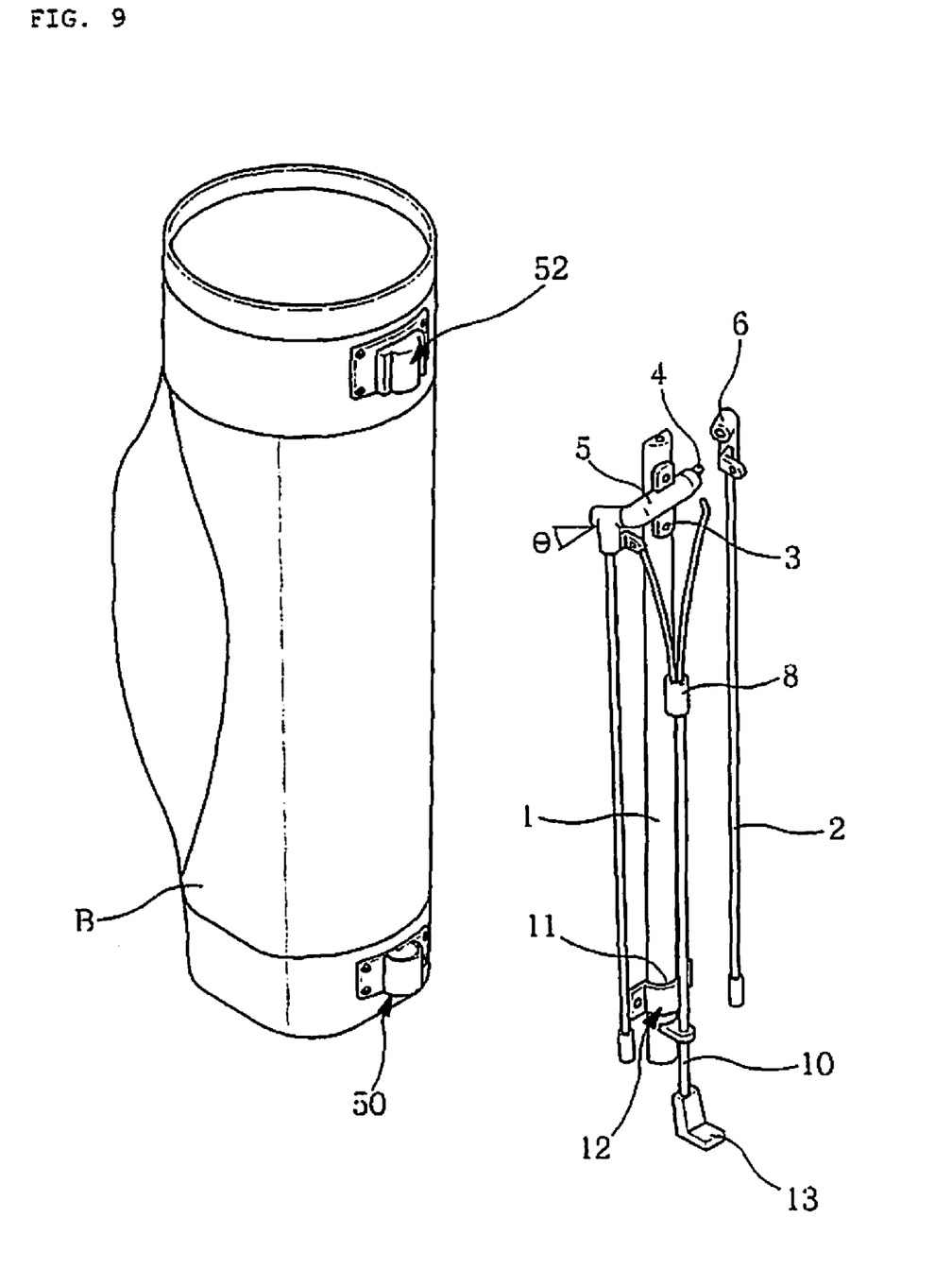
FIG. 9 is a perspective view of the golf bag carrier of FIG. 8a, when the support unit is separated.

The support assembly includes two struts 43 that are fixed by a hinge unit on an upper end of a vertical bar 5' that are fixed by the upper and lower end fixing members 7 and 8 to support the golf bag G in an unfolded state and closely contact the golf bag G in an folded state and an actuating unit that unfolds the struts 43 to support the golf bag G when the golf bag G is inclined at a first predetermined angle or more and to folds the struts 43 when the golf bag G is inclined at a second predetermined angle less than the first predetermined angle.

That is, when the golf bag G is inclined at the first predetermined angle with respect to the ground, the actuation unit operates to unfold the struts 43 so that the golf bag G can be supported by the strut 43 in the inclined state.

Figure 10:
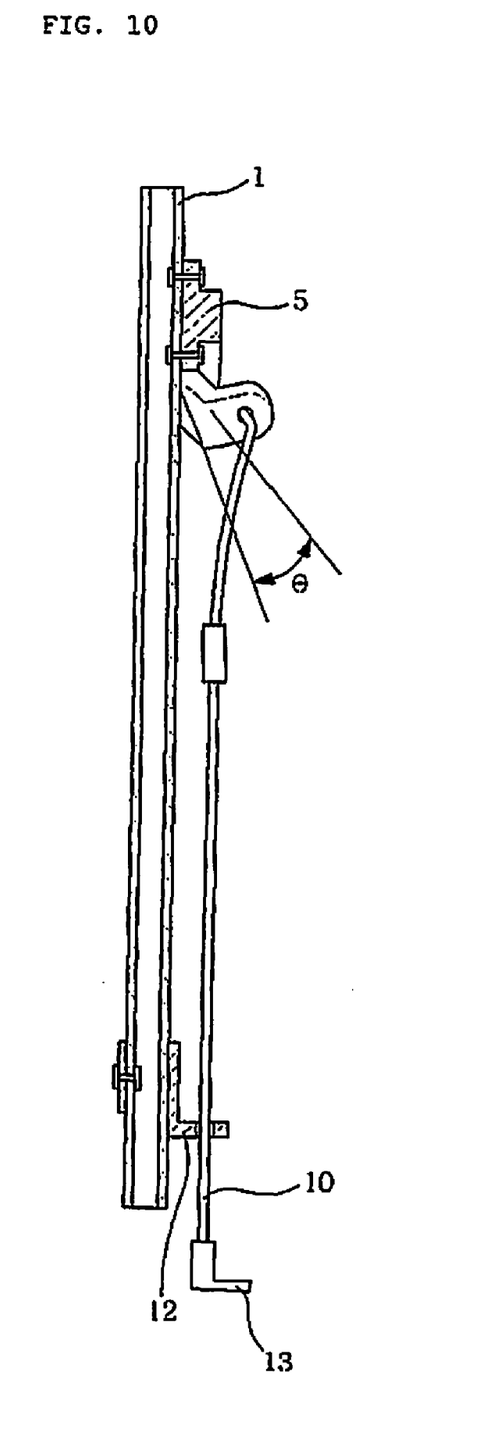
FIG. 10 is a sectional view of the support unit of FIG. 9.

The hinge unit is fixed by fasteners such as rivets. The hinge unit includes a hinge member 45 provided at both sides with hinge shafts 44 and fitting members 46 that are rotatably fitted around the hinge shafts 45 and further coupled to both sides of the upper end of the struts 43.

Particularly, the hinge shafts 44 are formed to be inclined rearward at a predetermined angle θ with respect to the hinge member 45 so that the struts 43 can be widely unfolded to stably support the golf bag G.

Further, the actuating unit includes fitting portions 47 protruding from the respective fitting members 46, springs 49 having respective first ends that are respectively fitted around the fitting portions 47 to be capable of rotating and respective second ends that bias the fitting portions 47 inward by being fixed by a spring coupling member 48, an actuating arm 50 having an upper end fitted in a lower end of the spring coupling member 48 and extending downward over the lower end of the vertical bar 5', and a guide member 52 fixedly installed on the lower end portion of the vertical bar 5' and provided with a guide hole 51 in which the actuating arm 50 is movably inserted.

Figure 11:
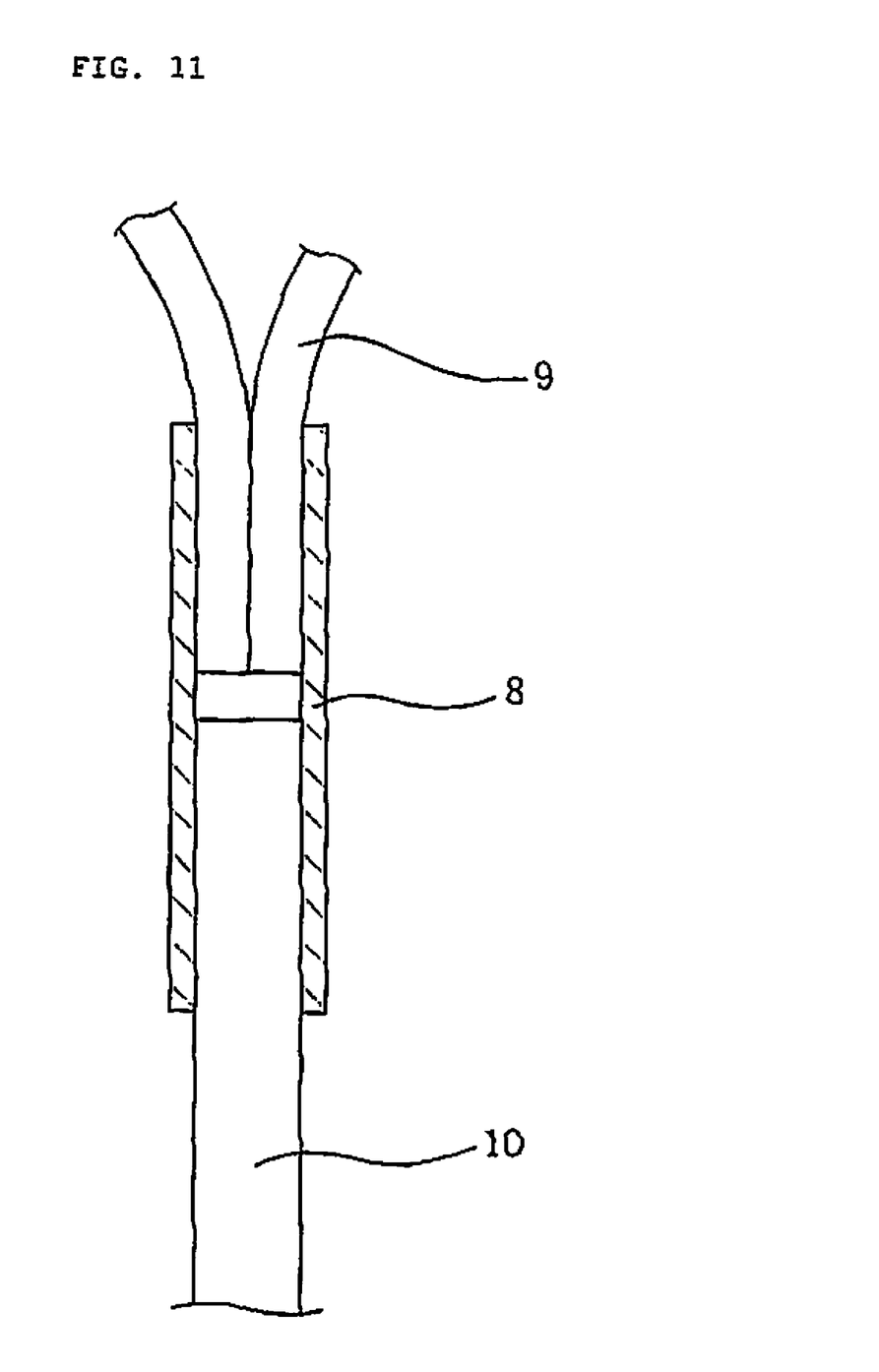
FIG. 11 is a sectional view of a spring coupling member of FIG. 9.

FIG. 11 shows a coupling state of the spring coupling member 48 and the springs 49.

As shown in FIGS. 11, the second ends of the respective springs 49 are fixedly inserted in an upper end of the spring coupling member 48 and the actuating arm 50 is inserted in the lower end of the spring coupling member.

Particularly, a ground contact member 53 is coupled to a lower end of the actuating arm 50 so that the support assembly can be supported on a larger area of the ground.

Describing an operational effect of the support assembly, when the user moves with the golf bag G on his/her shoulder or back or in a state where the golf bag G is loaded in a golf bag cart, the struts 43 closely contact the vertical bar 5' as shown in FIG. 5a.

That is, the upper end fixing member 8 is released and the vertical bar 5 with the wheels 2 are separated, after which the vertical bar 5' with the struts 43 is coupled to the upper end fixing member 8.

In this state, when the user intends to stand the golf bag G on the ground, as shown in FIG. 8b, the user puts the golf bag G down on the ground and inclines the golf bag G while pushing the actuating arm 50, by which the actuating arm 50 moves upward and the struts 43 rotate by the spring 49.

When the struts 43 rotate, the struts 43 rotate by the inclined angle θ of the hinge shafts 44 while being widened and thus the golf bag G can be stably supported on the ground in the inclined state.

That is, when the golf clubs are loaded in the golf bag G, the actuating arm 50 is pushed by the self-load of the golf bag G and thus the struts 43 are automatically widened. Therefore, the golf bag G can be naturally supported on the ground in the inclined state.

Needless to say, since the actuating arm 50 ascends and descends along the guide hole 51 of the guide member 52, it can very stably smoothly ascend and descend.

Here, the user can carry only the golf bag G by separating the vertical bar 5; with the struts and mounts the vertical bar 5 with the wheels 2. This can be easily realized by simply separating the vertical bar 5'.

As described above, the struts 43 are used when the user intends to carry the golf bag using the special golf bag cart. That is, in order to use the struts 43, the vertical bar 5 with the pivot adjusting unit 3 is separated from the lower and upper end fixing members 7 and 8 and the vertical bar 5' with the struts 43 are coupled to the upper end fixing member 7. Accordingly, the user selectively uses the golf bag carrier or the struts 43.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A golf bag carrier comprises:
    a pivot adjusting unit;
    at least one strut pivotally coupled to the pivot adjusting unit and adjusted in an angle with respect to a ground by the pivot adjusting unit;
    at least one wheel coupled to a lower end of the strut to move the golf bag;
    a fixing plate to which the pivot adjusting unit having the strut and the wheel are fixed;
    a vertical bar that is fixedly installed on a central portion of the fixing plate; and
    a fixing unit that is installed on the golf bag to detachably fix the vertical bar on the golf bag,
    wherein the fixing unit includes a lower end fixing member supporting a lower end of the vertical bar and an upper end fixing member supporting an upper end of the vertical bar, the lower end fixing member being provided with a coupling groove in which a lower end portion of the vertical bar is inserted down to a predetermined depth and fixedly installed on a lower portion of the golf bag G, and the upper end fixing member detachably supporting the upper end of the vertical bar, and
    wherein the upper end fixing member includes:
    a plate on which a pair of guide rails are formed;
    a guide block having guide grooves that are movably coupled to the guide rails formed on the plate and a space portion in which the upper end portion of the vertical bar is inserted;
    an elastic unit biasing the guide block downward; and
    a positioning unit that sets a location where the vertical bar is located within the space portion by moving the guide block downward and a location where the vertical bar ascends to separate the vertical bar.

2. The method of claim 1, wherein the elastic unit includes a fixing projection that vertically protrudes on an inner top surface of the guide block, a spring having a first end fitted around the fixing projection and a second end hooked on the plate, and a shielding plate that is formed on the plate to prevent the guide block from being removed upward by biasing force of the spring.

3. The golf bag carrier of claim 1, wherein the positioning unit includes:
    an adaptor that extends from the guide block and is provided with a hook rod receiving groove extending toward the plate and an operational button receiving groove formed through a side surface;
    a hook rod that is movably inserted in the hook rod receiving groove, provided with an inclined slit formed on a side surface thereof, and biased by a spring;
    an operational button that is movably inserted in the operation button receiving groove, engaged with the slit, provided with an operational rib to ascend and descend the hook rod, and biased by a spring; and
    a hook groove that is formed on the plate to hook the hook rod protruding and to determine a stopping position of the guide block in a vertical direction.

4. The golf bag carrier of claim 1, wherein the pivot adjusting unit includes:
    a main body coupled to the fixing plate; and
    an outer cover that is coupled to the main body and provided with a guide groove supporting a pivot motion of a second strut, a guide slot supporting a pivot motion of a first strut, and a second guide groove maintaining a pivot state of the first strut.

5. A golf bag carrier comprises:
    a pivot adjusting unit;
    at least one strut pivotally coupled to the pivot adjusting unit and adjusted in an angle with respect to a ground by the pivot adjusting unit;
    at least one wheel coupled to a lower end of the strut to move the golf bag;
    a fixing plate to which the pivot adjusting unit having the strut and the wheel are fixed;
    a vertical bar that is fixedly installed on a central portion of the fixing plate; and a fixing unit that is installed on the golf bag to detachably fix the vertical bar on the golf bag, wherein the pivot adjusting unit includes:

a guide rail formed on a main body of the pivot adjusting unit;

a guide groove which is formed on the fixing plate and in which the guide rail is inserted and fitted;

a fixing unit for fixing and separating the main body fitted in the guide groove, and wherein the fixing unit includes:

a hook rod provided with a fitting groove in which the guide rail of the main body inserted in the guide grooves is fitted; and a spring that biases the hook rod in a through hole formed in the fixing plate so that the hook rod can ascend and descend.

* * * * *